Sept. 14, 1948. E. W. AUSTIN 2,449,269
SELECTIVE HYDRAULIC CONTROL STRUCTURE
Filed Aug. 10, 1945 5 Sheets-Sheet 1
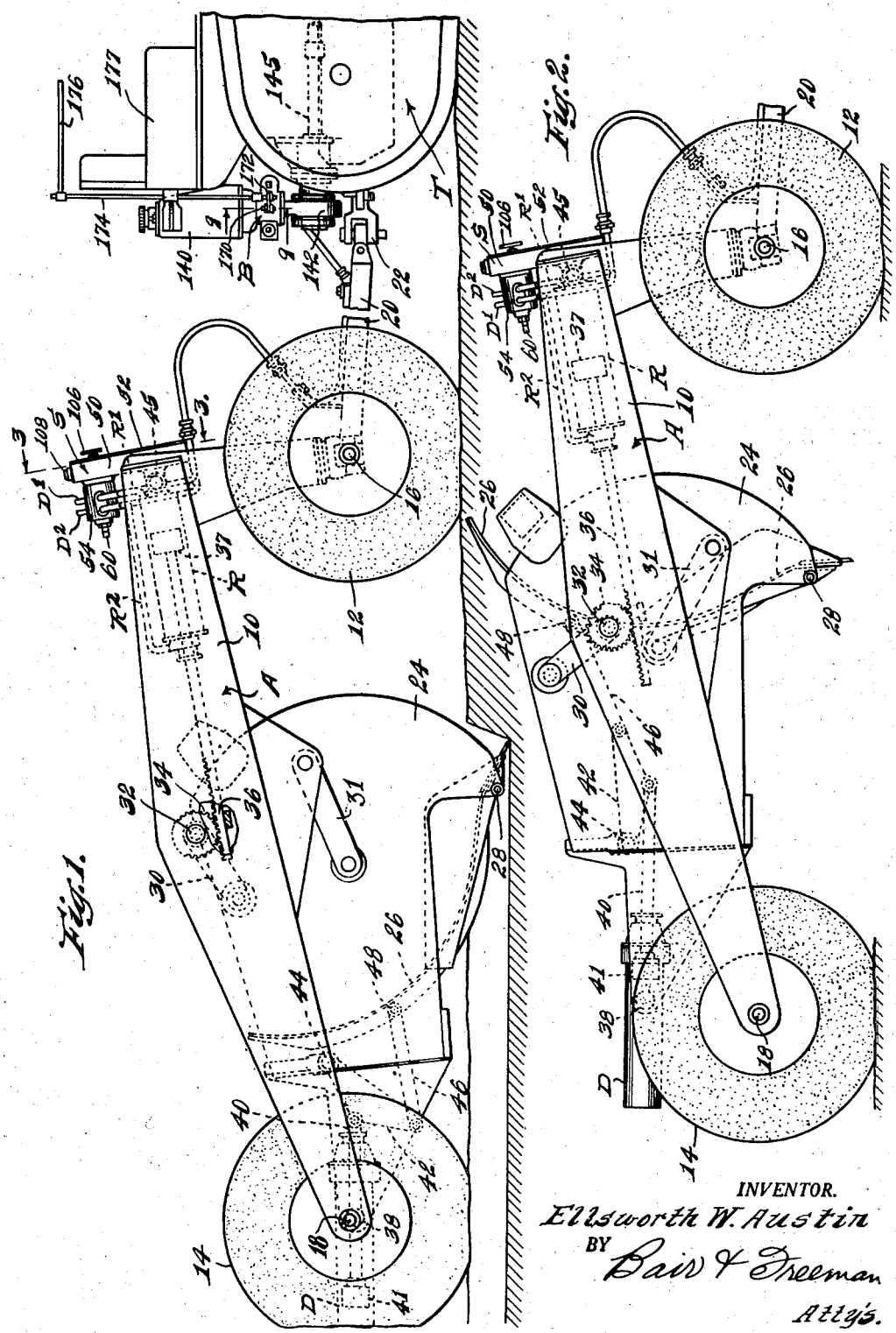
INVENTOR.
Ellsworth W. Austin
BY
Bair & Freeman
Atty's.

Sept. 14, 1948. E. W. AUSTIN 2,449,269
SELECTIVE HYDRAULIC CONTROL STRUCTURE
Filed Aug. 10, 1945 5 Sheets-Sheet 2
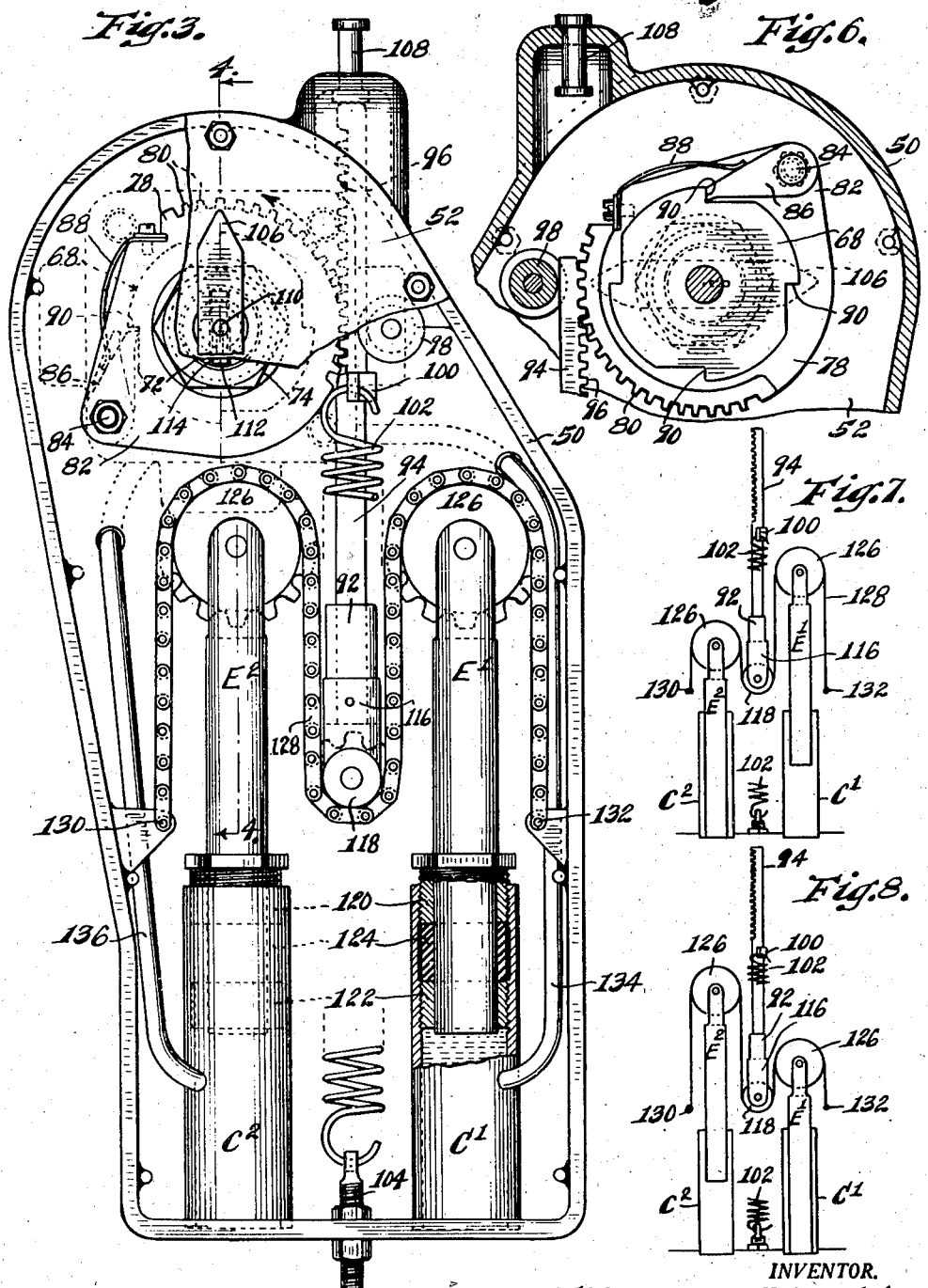
INVENTOR.
Ellsworth W. Austin.
BY Bair & Freeman
Attys.

Sept. 14, 1948.  E. W. AUSTIN  2,449,269
SELECTIVE HYDRAULIC CONTROL STRUCTURE
Filed Aug. 10, 1945  5 Sheets-Sheet 3
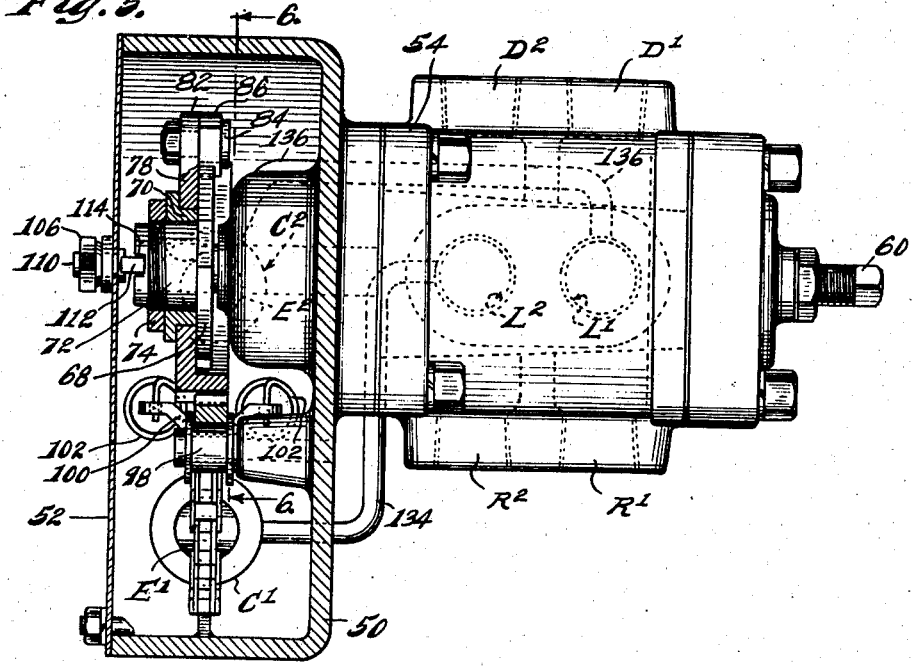
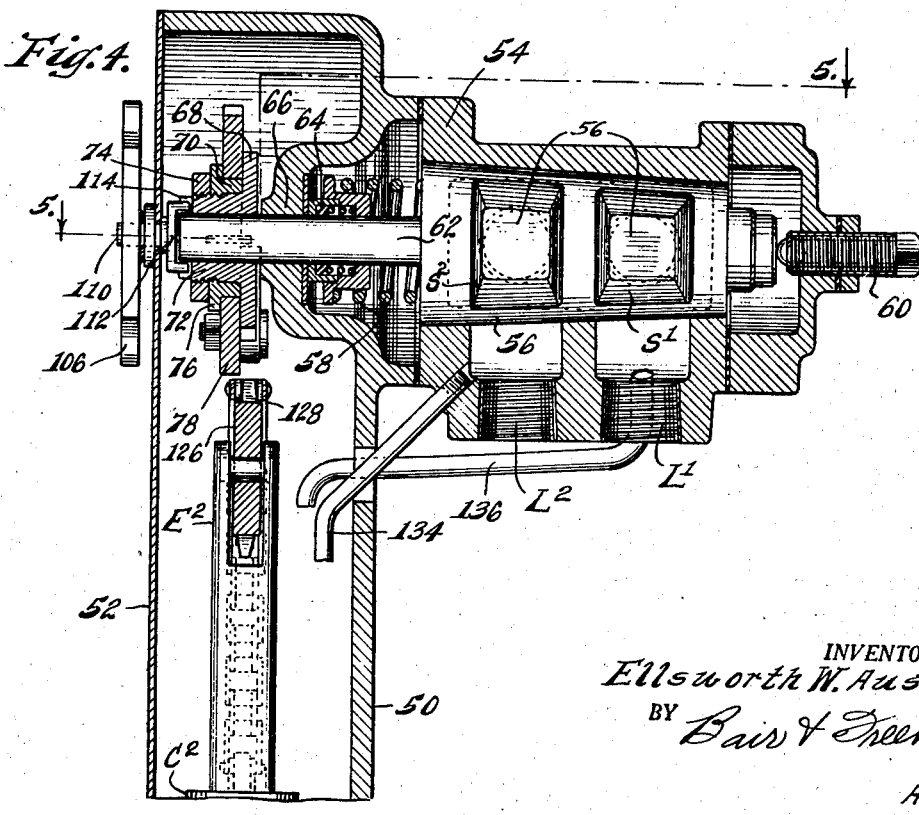
INVENTOR.
Ellsworth W. Austin.
BY Bair & Freeman
Attys.

Sept. 14, 1948.     E. W. AUSTIN     2,449,269
SELECTIVE HYDRAULIC CONTROL STRUCTURE
Filed Aug. 10, 1945     5 Sheets-Sheet 4
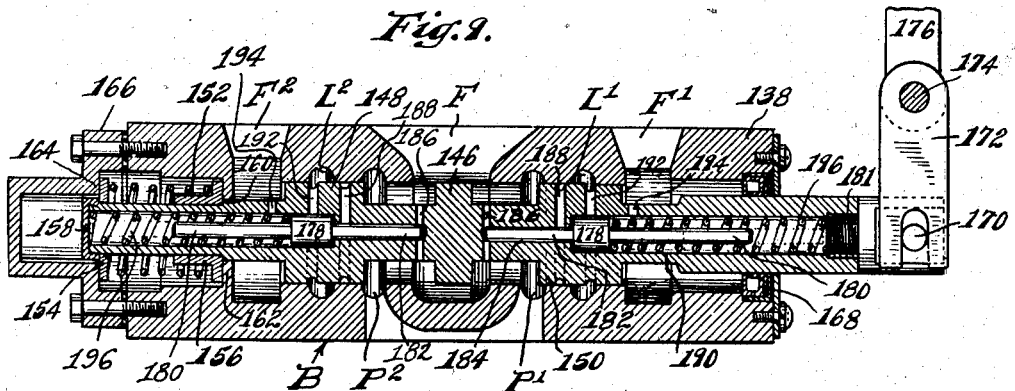
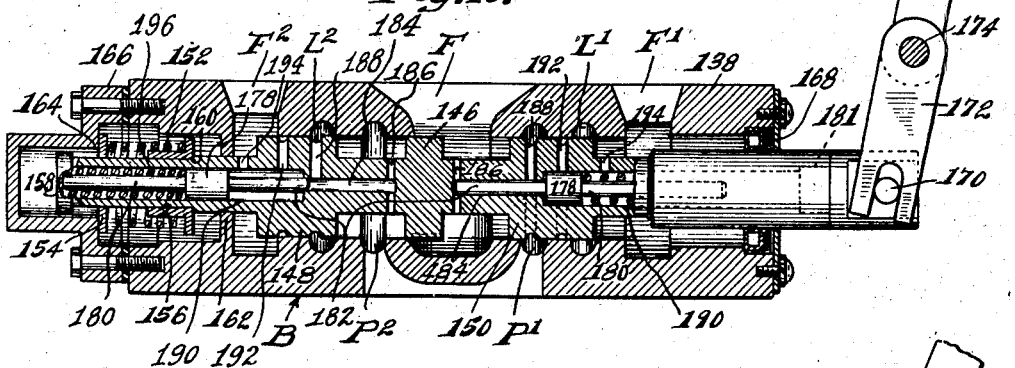
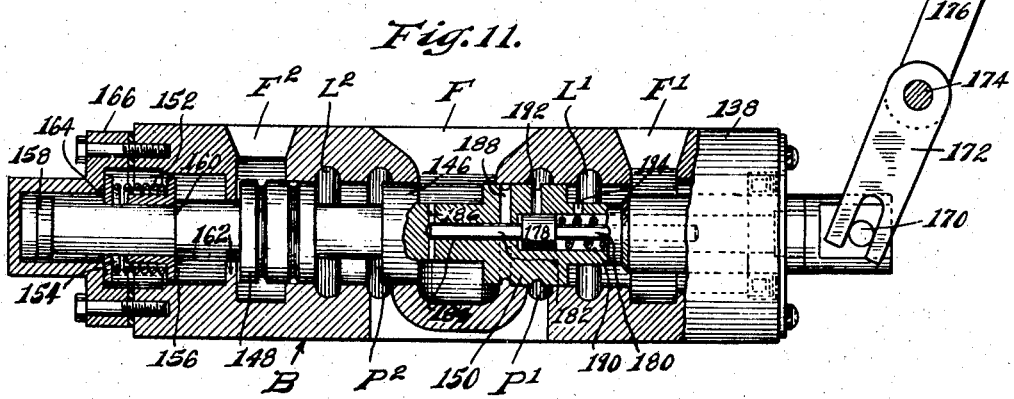
INVENTOR.
Ellsworth W. Austin.
BY
Bair & Freeman
Attys.

Sept. 14, 1948.  E. W. AUSTIN  2,449,269
SELECTIVE HYDRAULIC CONTROL STRUCTURE
Filed Aug. 10, 1945  5 Sheets-Sheet 5
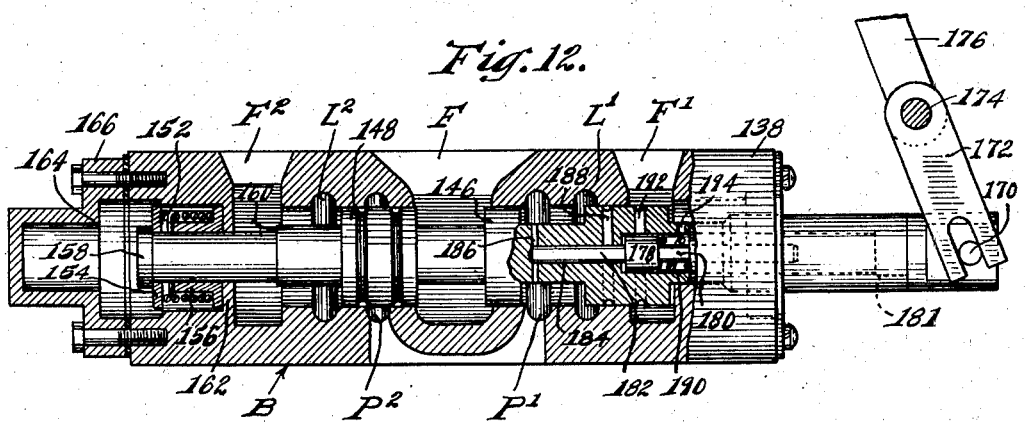
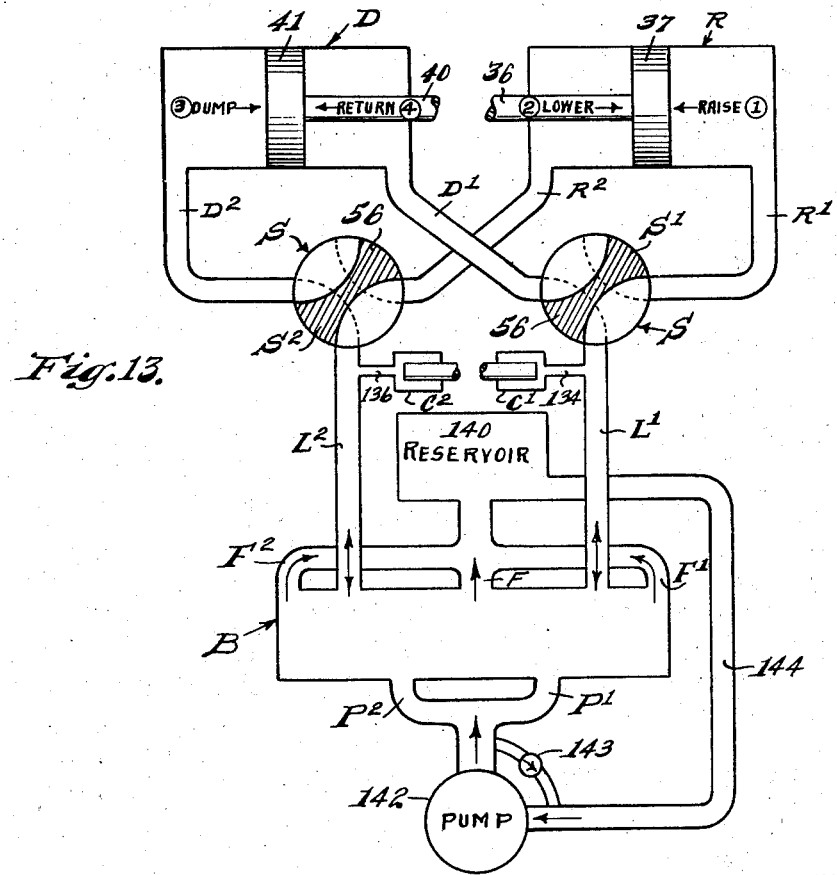
INVENTOR.
Ellsworth W. Austin.
BY Bair & Freeman
Atty's.

Patented Sept. 14, 1948

2,449,269

UNITED STATES PATENT OFFICE 2,449,269

SELECTIVE HYDRAULIC CONTROL STRUCTURE

Ellsworth W. Austin, Cedar Rapids, Iowa, assignor to La Plant-Choate Manufacturing Co., Inc., Cedar Rapids, Iowa, a corporation of Delaware Application August 10, 1945, Serial No. 610,116

11 Claims. (Cl. 60—97)

My present invention relates to a selective hydraulic control structure wherein a single set of hose from a source of hydraulic pressure to a hydraulically controlled device is sufficient for operating a plurality of different hydraulic jacks or the like on the hydraulically controlled device.

One object of the invention is to provide a control structure of this general character which may operate, for instance, the raising and lowering of a scraper and the dumping operations thereof through a single set of hose from a hydraulic pressure system on a tractor which pulls the scraper, the control structure including a selector valve on the scraper which can be operated in a certain position of a control valve on the tractor, which control valve is the usual type of hydraulic valve for producing pressure in one hose and relieving pressure from another, or vice versa, modified to include a means for operating the selector valve.

Another object is to provide a selector valve which is comparatively simple to manufacture and foolproof in operation, the valve being operable at will by means of introducing pressure in both hose leading from the control valve on the tractor to the selector valve.

A further object is to provide a selector valve which has a pair of hydraulically operable actuating mechanisms, one connected with one hose and the other with the other hose, the valve itself being operable to control the flow of oil to and from two hose which lead from the tractor to the selector valve so that they may be connected with either one or two, or more, hydraulic jacks on the scraper so that any desired one of the jacks can be operated in either direction, the hydraulic actuating mechanisms of the selector valve being so connected with an indexing means for the selector valve that pressure in either one of them will not actuate it, but pressure in both of them will actuate it.

Still a further object is to provide the control valve on the tractor primarily for introducing pressure into one hose from the tractor to the selector valve and relieving pressure from the other, and, secondarily, operable in a predetermined position to introduce pressure into the hose from which pressure has been relieved, thereby causing a build-up of pressure in both of the hydraulic actuating mechanisms of the selector valve in order to change the position of the valve.

Other objects are to provide an indicator on the selector valve to indicate which jack of the scraper is in circuit with the control valve on the tractor, indicator means on the selector valve for indicating the completion of an actuating stroke of the hydraulic actuating mechanisms of the selector valve, and a ratcheting mechanism for the selector valve which is operable in one direction by pressure in both of the hydraulic actuating mechanisms and actuated in the opposite direction by spring means, the spring means effecting rotation of the selector valve to a new position upon the relief of pressure from one of the hydraulic actuating mechanism by return of the control valve to a neutral position from its selector valve actuating position.

With these and other objects in view, my invention consists in the construction, arrangement and combination of the various parts of my device whereby the objects contemplated are attained, as hereinafter more fully set forth, pointed out in the claims and illustrated in the accompanying drawings, wherein:

Fig. 1 is a side elevation of my selective hydraulic control structure applied to a scraper hitched to a tractor and showing the scraper in lowered or digging position;

Fig. 2 is a side elevation of a portion of the scraper showing it raised and in dumping position;

Fig. 3 is a front elevation of the selector valve unit as viewed in the direction of the arrow 3 adjacent Fig. 1, a portion of the cover being removed, showing a rack for operating the selector valve in raised position;

Fig. 4 is a sectional view on the line 4—4 of Fig. 3 showing a cross-section through the selector valve itself and a portion of the ratchet mechanism for operating it;

Fig. 5 is a sectional view on the line 5—5 of Fig. 4 showing the selector valve in plan view;

Fig. 6 is a sectional view on the line 6—6 of Fig. 5 showing the ratchet mechanism and the rack for actuating it in lowered position;

Fig. 7 is a diagrammatic view showing the chain arrangement in the selector valve when the parts are in the position of Fig. 6;

Fig. 8 is a similar diagrammatic view showing an opposite chain arrangement with the rack also lowered, as in Fig. 6;

Fig. 9 is an enlarged sectional view on the line 9—9 of Fig. 1 showing a control valve on the tractor in a neutral position;

Fig. 10 is a similar sectional view showing the control valve in an intermediate position for operating the selector valve;

Fig. 11 is a similar sectional view showing the control valve at one limit of its movement;

Fig. 12 is a similar sectional view showing the control valve at its other limit of movement; and Fig. 13 is a hydraulic diagrammatic view showing the complete installation.

On the accompanying drawings I have used the reference character T to indicate, in general, a tractor, and A, in general, a scraper. On the scraper A I mount my selector valve unit, indicated generally at S, and on the tractor a control valve B is mounted.

The scraper A is shown merely by way of illustration, as my selector valve and the hydraulic system used in connection therewith may be used on any type of hydraulically controlled mechanism. Briefly, the scraper A includes a frame 10 supported on front steerable wheels 12 and rear wheels 14, the axles being shown at 16 and 18. A tongue 20 connects the scraper A to the drawbar 22 of the tractor T. The scraper bowl has a pair of sides 24 and a curved bottom plate 26. The plate 26 is pivoted at 28 so that it can be tilted up from the carrying position of Fig. 1 to the dumping position of Fig. 2. The scraper bowl can also be elevated from the digging position of Fig. 1 to the carrying position of Fig. 2, and for this purpose it is mounted on the frame 10 by two pairs of links 30 and 31. The links 30 are secured to a rock shaft 32 on which is mounted a gear 34 meshing with a rack 36. The rack 36 extends into a jack R, which may be termed a raising jack. The jack in Fig. 1 is in retracted position whereas in Fig. 2 it is in extended position for rocking the shaft 32 clockwise and thereby elevating the scraper bowl 24—26.

A second jack D, which may be termed a dump jack, is pivoted at 38 and has a piston rod 40 pivoted to a lever 42. The lever 42 is pivoted at its upper end to the scraper bowl sides at 44 and has a link 46 pivoted to its lower end, the link, in turn, being pivoted at 48 to the scraper bottom 26. When the jack D is in the retracted position of Fig. 1 the scraper bottom 26 is in the loading position, whereas extension of the jack to the Fig. 2 position swings the bottom 26 about the pivot 28 to a dumping or discharge position.

The selector valve unit S comprises a housing 50 having a cover 52, the housing being rigidly supported on the front end of the frame 10. Attached to the housing 50 is a valve body 54 (see Fig. 4) having therein a tapered valve plug 56. This plug is seated by a spring 58, an adjustable thrust screw 60 being provided to prevent the valve plug from being seated too tightly. The valve plug has a stem 62 extending through a packing 64 and through a bearing 66 of the housing 50. Keyed to the stem 62 is a ratchet disk 68. A spacer sleeve 70 is secured on a hub 72 of the ratchet disk 68 by a nut 74 mounted on a threaded portion of the hub. The spacer sleeve 70 has a flange 76, and between this flange and the ratchet disk 68 a gear sector 78 is mounted for free rotation on the spacer sleeve 70.

The gear sector 78 has gear teeth 80 (see Figs. 3 and 6) extending a little farther than 90 degrees around its circumference, and has an extension 82 carrying a pivot 84. A pawl 86 is mounted on the pivot 84 and constrained to engage the periphery of the ratchet disk 68 by a leaf spring 88. The ratchet disk, it will be noted, has four ratchet teeth 90.

Slidably mounted in a guide 92, which extends from the back wall of the housing 50, is a rod 94 having rack teeth 96 in a portion thereof. The teeth 96 mesh with the teeth 80, and a double-flanged guide roller 98 backs up the rod 94 adjacent the point of mesh with the teeth 80. A cross-bar 100 is mounted on the rod 94 and a pair of springs 102 is connected therewith and with adjusting screws 104 in the bottom of the housing 50. The springs 102 tend to pull the rod 94 downwardly, and the guide 92 provides a stop for the cross-bar 100.

Indicators are provided for the selector valve and the rack 96, these being shown at 106 and 108 respectively. The indicator 106 is mounted on a shaft 110 journaled in the cover plate 52 and provided with a tongue 112 to enter a slot 114 in the left-hand end of the valve stem 62, as shown in Fig. 4. The indicator 108 is of the poppet type, normally being in the position of Fig. 6 by gravity, and raised to the position of Fig. 3 by the rack 96 when it moves to its highest position.

The rod 94 has a fork 116 secured to its lower end, and an idler sprocket 118 is journaled in the fork. A pair of cylinders $C^1$ and $C^2$ is mounted in the housing 50, and these are provided with plungers $E^1$ and $E^2$. The plungers $E^1$ and $E^2$ slide in bearings 120 and 122, between which packings 124 are mounted.

The upper ends of the plungers $E^1$ and $E^2$ are forked, and sprockets 126 are journaled relative thereto. A chain 128 is secured at 130 to the housing 50, extends over the left-hand sprocket 126 in Fig. 3, under the sprocket 118, over the right-hand sprocket 126, and has its other end anchored at 132 to the housing 50.

The selector valve S has hydraulic lines $L^1$ and $L^2$ leading to the bottom thereof, and hydraulic lines $R^1$, $R^2$, $D^1$ and $D^2$ leading from the side outlets thereof, as indicated in Figs. 4 and 5 and as shown diagrammatically in Fig. 13. The lines $L^1$ and $L^2$ are the two hose which lead from the control valve B on the tractor T, whereas the other lines extend to the raising and dumping jack cylinders, as clearly shown in the latter figure. The lines $L^1$ and $L^2$ also have branch lines 134 and 136 leading to the cylinders $C^1$ and $C^2$ respectively.

The control valve B (see Figs. 9 and 13) comprises a valve body 138 having ports for connection to the lines $L^1$ and $L^2$, and these ports are likewise indicated as $L^1$ and $L^2$. The valve body also has power or pump ports $P^1$ and $P^2$ and return ports F, $F^1$ and $F^2$. The ports F, $F^1$ and $F^2$ are connected with an oil reservoir 140, as shown in Fig. 13, whereas the power ports $P^1$ and $P^2$ are connected with a pump 142. The pump receives oil, as through a line 144 from the reservoir 140. The pump operates continuously, it being operatively connected to the engine of the tractor by means of an extension shaft 145 shown in Fig. 1.

Slidable in the bore of the valve body 138 is a control plunger having lands 146, 148 and 150. The valve plunger is retained normally in the centered or neutral position of Fig. 9 by a spring 152 interposed between a washer 154 and a sleeve 156. The valve plunger has a head 158 for engaging the washer and a shoulder 160 for engaging the sleeve 156. The sleeve is also adapted to engage a stationary shoulder 162 of the valve body, and said washer is also adapted to engage a shoulder 164 of a cap 166 secured to the valve body.

At the opposite end of the valve plunger it extends through a packing 168 and is connected by means of a pin 170 and a yoke 172 to a control rock shaft 174. In Figs. 9, 10, 11 and 12 the yoke 172 and the pin 170 have been turned a quarter turn with relation to the section line 9—9 so as to show the position of the yoke 172 in various positions of the valve, as illustrated in these figures. The upper end of the rock shaft has a handle 176 adapted to be manipulated by the operator of the tractor and scraper from his position in a seat 177 on the tractor.

Within the control valve plunger I provide a selector valve operating plunger 178 having stems 180 and 182. The stem 182 is slidable in a bore 184 to cooperate with ports 186 and 188. The plunger 178 is slidable in a bore 190 to cooperate with ports 192 and 194. A spring 196 normally extends the plunger 178 to the position shown by full lines in Fig. 9. While I have shown the selector valve control plunger 178 in both halves of the control valve B in Fig. 9, one control plunger only need be provided, as will hereinafter appear.

Returning to the selector valve S, the valve plug 56, as shown in Fig. 13, has a pair of partitions $S^1$ and $S^2$ for controlling the flow of fluid between the lines $L^1$ and $R^1$ and the lines $L^2$ and $R^2$, as shown, or (in a 90-degree rotation of the valve plug) between the lines $L^1$ and $D^1$ and the lines $L^2$ and $D^2$, as shown by the dotted positions of the valve plug.

*Practical operation*

In the operation of my selective hydraulic control structure, assuming the control valve B in the neutral position of Fig. 9, the oil is merely by-passed through the control valve by being pumped into the ports $P^1$ and $P^2$ and finding its way directly to the return passageway F and through it to the reservoir 140. Assuming that the selector valve is in the full-line position of Fig. 13, and that the scraper is in the raised position of Fig. 2, with the load of the scraper thereby tending to lower in the frame 10 and push the rack 36 into the cylinder R, as indicated by the arrow 2 on the rack in Fig. 13, there will be pressure in the right-hand end of the cylinder R, and, accordingly, in the lines $R^1$ and $L^1$. This pressure is held in the control valve B due to the land 150 blocking the port $L^1$ and the selector valve control plunger 178 blocking the passageway 192 so that the oil thus under pressure in the line $L^1$ will not pass through this passageway and the passageway 194 back into the reservoir 140 through the port $F^1$. Since the cylinder $C^1$ is connected with the line $L^1$ by the tube 134 there will likewise be pressure in it which will cause the plunger $E^1$ to be in its upper position, as shown in Fig. 7. The plunger $E^2$ will be down because the line $L^2$ is blocked off by the land 148 in Fig. 9, and since the load of the scraper is tending to move the piston 37 in the jack cylinder R toward the right in Fig. 13 the pressure is relieved in the lines $L^2$ and $R^2$ and the tube 136 and its cylinder $C^2$.

After the scraper has been wheeled to the place where its load is to be deposited, it is desirable to reverse the selector valve S to the dotted position in Fig. 13, and this is accomplished by first moving the control valve B to the intermediate position shown in Fig. 10 and then permit it to return to the Fig. 9 position. In the Fig. 10 position it will be noted that the line $L^1$ is still blocked off by the land 150, and this land also blocks off the flow of pumped oil from the port $P^1$ to the return port F. The land 146 is now in position to block off the oil under pressure from the port $P^2$ to the return port F so that the pump 142 can build up a pressure for operation of the selector valve, that pressure being limited by a return by-pass 143 in the pump 142 in the usual manner.

In the position of Fig. 10 the left-hand port 186 receives oil from the port $P^2$, thereby acting on the stem 182 of the left-hand plunger 178 to force the plunger back against the action of the spring 196 to its limit of movement where the stem 180 engages the cap 158. This opens the left-hand passageway 188 into the valve port $L^2$ so that oil can now flow through the left-hand passageways 186, 184 and 188 to the line $L^2$, thereby building up pressure in it and in $R^2$, 136 and $C^2$ until that pressure is equal to the opposing pressure in the blocked lines $L^1$ and $R^1$ and the right-hand end of the jack cylinder R. This build-up of pressure in the cylinder $C^2$ raises the plunger $E^2$ to the position of Fig. 3, which elevates the rod 94 and its rack teeth 96 from the position of Fig. 6 to the position of Fig. 3, thereby rotating the gear 80 so that the pawl 86 will engage in the next counter-clockwise tooth 90 of the ratchet disk 68. The indicator 108 will rise to the position of Fig. 3 to indicate to the operator when the end of the rack stroke has been reached.

The operator can then return the control valve plunger to the neutral position of Fig. 9 by releasing the control handle 176. The spring 152 effects such return to the neutral position, but the plunger 178 will remain in relation to the control valve plunger in the position shown in Fig. 10. Since the passageway 192 is now in registry with the port $L^2$, due to the control valve plunger having returned to the Fig. 9 position, oil from $L^2$ passes into the bore 190 of the control valve plunger and out through the passageway 194 to the return port $F^2$. This permits the springs 102 of the selector valve to slide the rod 94 downwardly, carrying with it the sprocket 118 and lowering the plunger $E^2$. After the cross-bar 100 engages the guide 92 the pressure will be further relieved, and, finally, will permit the spring 196 to return the left-hand plunger 178 from the position of Fig. 10 to the position of Fig. 9, ready for another selector valve operation.

As the rod 94 moves downwardly it rotates the gear 80 clockwise, and the pawl 86 carries the ratchet disk 68 with it, thereby indexing the selector valve through a 90 degree arc and changing the indicator 106 from a vertical position, indicating that the selector valve is set for raising and lowering operations, to a horizontal position, indicating that it is set for dumping operations.

Since the selector valve is now in the dotted position of Fig. 13 the dumping jack D will be operated and the load may be dumped by movement of the control valve to the position of Fig. 11. In this position it will be noted that the power port $P^2$ is connected with the line $L^2$ and the line $L^1$ is connected with the return port $F^1$ so that the piston 41 of the dump jack D will move toward the right, as indicated by the arrow 3 in Fig. 13. The scraper bowl bottom 26 will then be in the dumping position shown in Fig. 2, and to return it to the Fig. 1 position, as indicated by the arrow 4 in Fig. 13, the control valve B is adjusted to its opposite limit of movement, as shown in Fig. 12, thus connecting the line $L^1$ with the power port $P^1$ and the line $L^2$ with the return port $F^2$.

The next desirable operation is usually the lowering of the bowl, and, accordingly, the control valve is again adjusted to the intermediate position of Fig. 10 for changing the position of the selector valve, as already described. In this instance there is pressure in the line $L^1$ because this is the line which has last been pressurized to cause return of the pump piston 41. The selector valve may also be operated by elevating the plunger $E^1$ while the plunger $E^2$ is in the elevated position of Fig. 8. This is accomplished by having a second selector valve control plunger 178 in the other half of the control valve plunger, as shown in Fig. 9. Thus by moving the control lever 176 to an opposite intermediate position after dumping or scraper bowl lowering operations, the selector valve can also be operated. I make provision for this by the use of the two plungers E¹ and E², either of which, when extended, will not raise the rack 96, as shown in Figs. 6, 7 and 8. However, when either one of them is raised, and then the other one is raised by also charging its cylinder C¹ or C², as the case may be, with oil under pressure, the rack is then raised, as in Fig. 3, and when it is again lowered by the spring 102 it will index the selector valve a quarter turn, providing the rack 96 has been raised its full stroke. Thus, as long as there is pressure in one of the lines L¹ and L², and the pressure is relieved from the other line, as in normal scraper raising and dumping operations, the selector valve will not be indexed, but by building up pressure in both lines L¹ and L² it is indexed, and this particular adjustment is accomplished by the intermediate positions of the control valve, as shown in Fig. 10.

As indexing occurs usually only after raising the scraper or returning the scraper bottom 26, the second selector control valve plunger 178 in the right-hand end of the control valve need not be provided. However, so that it is immaterial which way the lines L¹ and L² from the tractor are hooked up to the selector valve it is desirable to provide the second selector valve control plunger, and this is also desirable from the standpoint of being able to index the selector valve after dumping and lowering operations, as well as after dump return and raising operations.

My selective hydraulic control structure eliminates the necessity of employing two sets of hose from the tractor to the scraper, or in the case of a scraper having a third hydraulic jack, such as one for opening and closing an apron at the front of the bowl, it eliminates the necessity of having three sets of hose. The selector valve unit can be made to index one sixth of a turn instead of one quarter of a turn for the raising, dumping and apron operating jacks of such a scraper, or can index a lesser degree for controlling further hydraulically actuated devices. It is not necessarily limited to the control of only two jacks, as shown on the drawings, but may be extended to any feasible number, as will be obvious.

When the control system is applied to a tractor and a scraper, as shown on the drawings by way of illustration, it eliminates a push-pull cable or other auxiliary device for operating a transfer valve on the scraper in those types of systems having only a pair of hose extending to the transfer valve. With my arrangement a single pair of hose reduces the likelihood of entanglement, especially during turning operations of the tractor, some of which are at extreme angles wherein hose lines and push-pull cables, at the best, suffer severely in becoming kinked, caught on stumps or rocks, and, in some instances, being caught by the crawler treads of a track laying type of tractor. At the same time, a selector valve is provided which is readily operable by the same control valve which normally reverses the oil flow in the lines L¹ and L², it being merely necessary to move the valve to an intermediate position and then let it return to neutral position for effecting a selector valve indexing operation. The indicators 106 and 108 on the selector valve can be readily seen by the operator from the seat 177 of the tractor, and this is not an inconvenience, as he must watch the operation of the scraper, as well as the road ahead of the tractor during his earthmoving operations.

Some changes may be made in the construction and arrangement of the parts of my device without departing from the real spirit and purpose of my invention, and it is my intention to cover by my claims any modified forms of structure or use of mechanical equivalents which may be reasonably included within their scope.

I claim as my invention:

1. In a selective hydraulic control structure, a selector valve having a plurality of positions, hydraulically operated devices selectively connected therewith in the various positions thereof, a control valve, a pair of lines leading from said control valve to said selector valve and receiving oil under control of said control valve, and actuating means for said selector valve including a pair of hydraulically actuated elements, one connected with each of said lines, means cooperating with said selector valve to condition the same for indexing only when there is build-up of pressure in both of said lines, and means included in said control valve for affording such build-up of pressure in both lines at a predetermined position of said control valve.

2. In a selective hydraulic control structure, a plurality of hydraulically operated devices, a selector valve for selectively controlling the flow of pressure fluid to said devices, a control valve, a pair of lines leading from said control valve to said selector valve for delivering pressure fluid to any of the hydraulically operated devices hydraulically communicating with the selector valve and under control of said control valve, and actuating means for said selector valve including a pair of hydraulically actuated elements, one connected with each of said lines and connected with said selector valve to condition the same for indexing only when pressure fluid is simultaneously introduced to said lines, and means included in said control valve for effecting such introduction at a predetermined position of said control valve.

3. In a selective hydraulic control structure, a selector valve having a plurality of positions, hydraulically operated devices selectively connected therewith in the various positions thereof, a pair of pressure fluid lines leading to said selector valve, means affording alternate build-up and relief of pressure therein for actuating said hydraulically operated devices, and actuating means for said selecter valve including a pair of hydraulically actuated elements, one connected with each of said lines and both operatively engaging with said selector valve to condition the same for indexing when there is simultaneous build-up of pressure in both of said lines.

4. In a selective hydraulic control structure, a selector valve having connections with a pair of hydraulic lines, one of which supplies pressure fluid thereto and the other of which relieves pressure fluid therefrom, said selector valve being connected with a pluraltiy of hydraulically actuated devices for selective operation thereof, indexing mechanism for changing the position of said selector valve, and means responsive to pressure in both of said lines for conditioning the indexing mechanism to perform the indexing operation.

5. In a hydraulic system of the character disclosed, a pluraltiy of hydraulically actuated devices, a selector valve connected therewith, indexing mechanism for said selector valve, said indexing mechanism including a pair of fluid pressure responsive devices for operating the indexing mechanism upon build-up of pressure in either of said pressure responsive devices, hydraulic fluid supply lines connected with said selector valve, one of said pressure responsive devices being connected with one of said supply lines and the other of said devices being connected with the other of said supply lines, said selector valve in different positions thereof connecting said lines with different ones of said hydraulically actuated devices, a control valve for said lines for normally building up pressure in one and relieving it from the other, and means included in said control valve affording a build up in pressure in both of said lines for conditioning said indexing mechanism for operation.

6. In a hydraulic system of the character disclosed, a plurality of hydraulically actuated devices, a selector valve connected therewith, a pair of pressure responsive devices, a ratchet drive for said selector valve driven in one direction by either of said pressure responsive devices when it responds to pressure while the other one is also responding to pressure, a spring return for said ratchet drive when the pressure is relieved from either of said pressure responsive devices, hydraulic fluid supply lines connected with said selector valve, said pressure responsive devices being connected one with each of said supply lines, said selector valve in different positions thereof connecting said lines with different ones of said hydraulically actuated devices, a control valve for said lines for normally building up pressure in one and relieving it from the other, means in one position of said control valve for building up pressure in both of said lines for effecting operation of said ratchet drive, and means operable in another position of the control valve for relieving pressure from one line and its associated pressure responsive device to permit the spring to return the ratchet drive and thereby index the selector valve.

7. In a hydraulic system of the character disclosed, a plurality of hydraulically actuated devices, a selector valve connected therewith, a pair of pressure responsive devices, a ratchet drive operated by either of said devices when it responds to pressure while the other one is also responding to pressure, hydraulic fluid supply lines connected with said selector valve, said pressure responsive devices being connected one with each of said supply lines, said selector valve in different positions thereof connecting said lines with different ones of said hydraulically actuated devices, a control valve for said lines for normally affording building up of pressure in one and relieving it from the other, and means in one position of said control valve for affording building up of pressure in both of said lines for conditioning said system for operation of said ratchet drive.

8. In a hydraulic system of the character disclosed, a plurality of hydraulically actuated devices, a selector valve connected therewith, a pair of hydraulic fluid supply lines connected with said selector valve, said selector valve, in different positions thereof, connecting said lines with different ones of said hydraulically actuated devices, a control valve for said lines for normally affording building up of pressure in one and relieving it from the other, said control valve including a pressure operated selector valve control element operable to permit build-up of pressure in the low pressure line of said pair of lines in a selector valve operating position of said control valve, hydraulic actuating mechanisms connected with said pair of lines and operable upon pressure in both of said mechanisms to condition said system to index said selector valve to a newly selected position, said selector valve having an indicator thereon to show the position of the valve.

9. In a hydraulic system, a plurality of hydraulically actuated devices, a selector valve connected therewith, indexing mechanism for said selector valve, a pair of hydraulic fluid supply lines connected with said selector valve, said selector valve, in different positions thereof, connecting said lines with different ones of said hydraulically actuated devices, a control valve for said lines for normally building up pressure in one line and relieving it from the other, said control valve including a pressure operated selector valve control element operable to permit build-up of pressure in the low pressure line of said pair of lines in a selector valve operating position of said control valve, and to reduce the pressure in said low pressure line in another position of said control valve, hydraulic actuating mechanisms connected with said pair of lines and operable upon pressure in both of said mechanisms to move said indexing mechanism to one limit of movement, spring means to return said indexing mechanism and thereby index said selector valve to a newly selected position when the pressure in one of said mechanisms is reduced by said control element, said selector valve having an indicator thereon to show the position of the valve and a second indicator to show the completion of the stroke of the indexing mechanism to said limit of movement.

10. In a hydraulic system of the character disclosed, a plurality of hydraulically actuated devices, a selector valve connected therewith, hydraulic fluid supply lines connected with said selector valve, said selector valve, in different positions thereof, connecting said lines with different ones of said hydraulically actuated devices, means affording build up of pressure in both of said lines, hydraulic actuating mechanisms connected with said lines and operable upon build-up of pressure in both to condition said selector valve for indexing to a newly selected position, said selector valve having an indicator thereon to show the position of the valve.

11. A hydraulic system for a tractor and a vehicle moved by the tractor comprising a pump for hydraulic fluid, a plurality of hydraulically operated devices, a hydraulic control system comprising a control valve for controlling the direction of the flow of said hydraulic fluid, a selector valve for selecting which of said hydraulic devices is to be operated, two conduits only for conveying hydraulic fluid from said control valve to said selector valve, a single manually operated lever for mechanically operating said control valve to select the direction of flow of said hydraulic fluid, and means in said control valve operated by said mechanical movement for hydraulically operating said selector valve through said two conduits to select which of said hydraulic devices is to be operated.

ELLSWORTH W. AUSTIN.

REFERENCES CITED

The following references are of record in the file of this patent:

UNITED STATES PATENTS

| Number | Name | Date |
|---|---|---|
| 1,759,647 | Kincannon | May 20, 1930 |
| 2,078,749 | Wood | Apr. 27, 1937 |
| 2,274,527 | Buran | Feb. 24, 1942 |